June 2, 1931. G. LANGFORD 1,808,466

METHOD OF REFORMING BARS

Original Filed July 16, 1926   5 Sheets-Sheet 1

Inventor:
George Langford.
By Brown, Jackson, Boettcher & Dienner
Attys.

June 2, 1931.  G. LANGFORD  1,808,466
METHOD OF REFORMING BARS
Original Filed July 16, 1926  5 Sheets-Sheet 4

Inventor:
George Langford.
By Brown, Jackson, Boettcher & Dienner.
Atty's

June 2, 1931.  G. LANGFORD  1,808,466

METHOD OF REFORMING BARS

Original Filed July 16, 1926  5 Sheets-Sheet 5

Inventor
George Langford.
By Brown, Jackson, Boettcher & Dienner.
Attys.

Patented June 2, 1931

1,808,466

UNITED STATES PATENT OFFICE

GEORGE LANGFORD, OF JOLIET, ILLINOIS, ASSIGNOR TO McKENNA PROCESS COMPANY OF ILLINOIS, OF JOLIET, ILLINOIS, A CORPORATION OF ILLINOIS

METHOD OF REFORMING BARS   REISSUED

Original application filed July 16, 1926, Serial No. 122,864. Divided and this application filed March 20, 1929. Serial No. 348,369.

The present invention relates generally to the forming of angle bars used in rail joint construction, and has to do more particularly with the reconstruction of worn angle bars. It has particular reference to a process or method of treating the worn bar so as to provide accurately finished fishing surfaces at both the flange and the head of the bar, and accurate spacing of such surfaces.

The type of bar referred to is that more commonly used as fish plates for rail joints. Each rail joint is commonly supplied with two such plates or bars, each presenting wedge surfaces to head and flange of the rail. Both plates are bolted together through the rail web. The construction is such that the rails and plates have registering holes for the clamping bolts.

In spite of the use of such plates, the joints can not be made as rigid as any portion of a single rail. No portion of the rail is perfectly rigid and the heavy load, concentrated at single traveling points, causes the rail to flex. The ends of the rails are most subject to flexing and the sudden transfer of a load by the passage of a car wheel from one rail to another causes rapid and violent relative motion of abutting rail ends past each other. This motion causes the fish plate to oscillate to a slight extent, rubbing on the moving rails. The rubbing of the parts wears down the wedging surfaces.

These worn plates, however, contain substantially all the initial metal and retain their general initial form. The apparent defects are practically superficial so that the worn plate provides a skeleton and also a mass of metal for rebuilding it into a useful form.

The general object of the present invention is to provide a process or method of reconditioning and reforming worn plates.

Another important object of the invention is to provide a die movable in one direction by applied pressure so arranged that it exerts pressure substantially laterally with respect to the applied pressure.

Other ancillary objects and advantages of the invention will be apparent from the following description as set forth in connection with the accompanying drawings, in which.

It is to be understood that the invention is susceptible to various modifications and departures differing from the steps and apparatus herein disclosed. Consequently, the detailed description hereinafter following and given only by way of explanation is not to be construed as a limitation of the invention short of the scope of the appended claim.

Bars used in two-way tracks where traffic alternates in both directions, have resultant fishing surface wear comparatively even in the two halves of the bar, the greatest wear being at the center. In a bar with extended flange, the flange fishing surface is more difficult to reform than the head fishing surface because of its greater area and the difficulty of subjecting it to direct pressure.

Figures 1, 2, 3, 4:
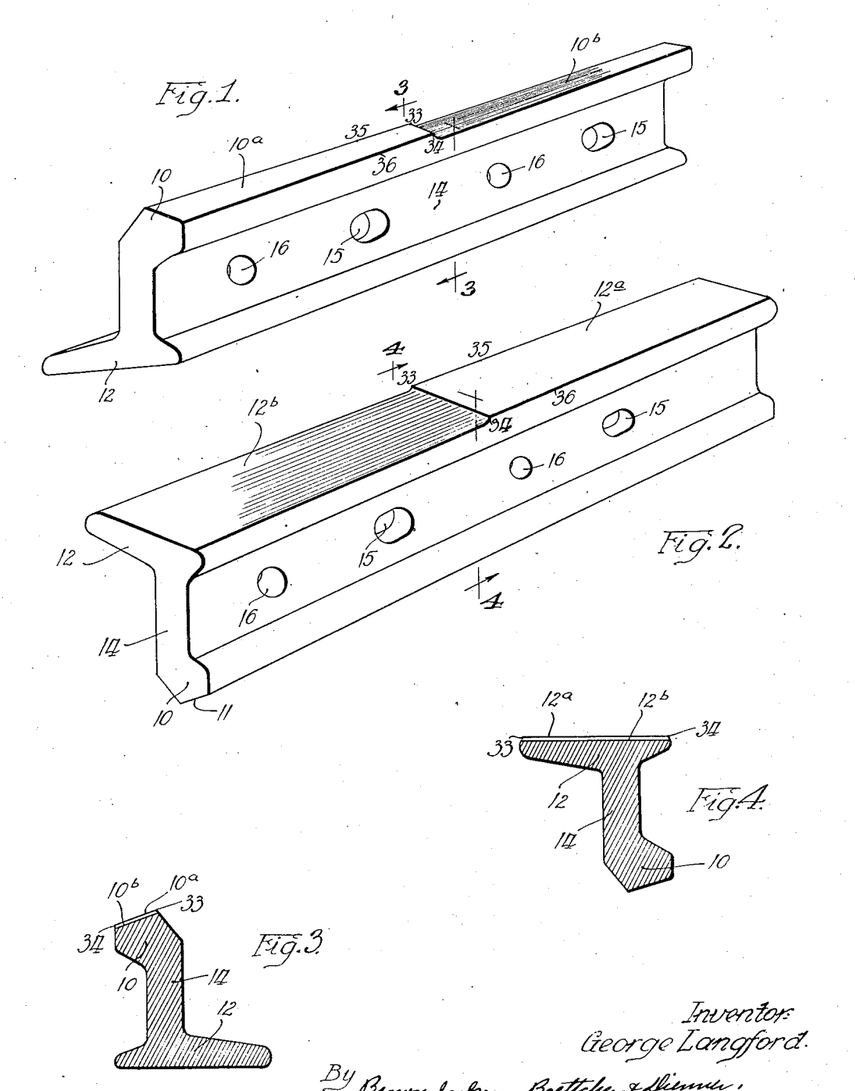
Figure 1 is a perspective view of a worn bar used on a one way track, that is a track in which the traffic travels in one direction only, showing the wear of the head of the bar.
Figure 2 is a perspective view of the bar of Figure 1 showing the wear of the flange of the bar.
Figures 3 and 4 are sectional views taken substantially on lines 3—3 and 4—4, respectively, of Figures 1 and 2.

Bars which are used in one way tracks, that is in tracks on which the traffic moves in one direction only, are subject to wear entirely different from that of bars used in two way tracks. In Figures 1 to 4 of the drawings, inclusive, I have illustrated a worn bar used in a one way track showing the characteristic wear of such a bar. The two halves of the bar do not wear equally on a one-way track and one-half wears more and differently from the other. In Fig. 1 one half 10a of the bar-head 10 is worn at the center considerably less than the other half 10b which is deepest at the center of the bar and tapers sharply to midway between the center and the end of the bar. The same is true of the flange 12 which although only slightly worn at half 12a is much worn at half 12b, particularly at the center of the bar.

The extent of such wear is approximately as shown by the parallel shade lines in Figures 1 and 2.

Bars with one way track wear as in Figures 1 and 2 are the most difficult to reform, and it is impossible to reform flange wear as in Figure 2, without some special method whereby great pressure can be exerted on the left one half of the bar to bring the worn one half to a proper finish without any break between the two halves or portions of the fishing surface of the bar. I have found that in the prior art one way track bars have frequently been scrapped rather than attempt reforming, and that of those reformed, many do not fit properly, which is to be expected where the worn half of the flange fishing particularly has not been accurately restored.

In the reforming of rail joint bars, the greatest accuracy must be observed in the forming of the fishing surfaces and the height of the bar. The head of the bar presents a body of metal of considerable mass which can be readily spread by vertical pressure only applied thereto in such manner as to force the fishing surface of the head into tight contact with the corresponding wall of the forming die cavity. There is, therefore, no great difficulty encountered in properly reforming the head of the bar. The flange of the bar, on the contrary, is relatively thin and is disposed at an angle not far removed from the vertical, when the bar is in a forming die of a press in which the dies have relative vertical movement.

The angle of the flange to the direction of relative movement of the dies is slight, whether the relative movement of the dies be vertical or horizontal. For this reason, the pressure applied to the flange by the forming die is indirect and it is impossible, in dies of the prior art, to obtain the proper amount of pressure on the flange, such pressure being properly directed to force the fishing surface of the flange into forming contact with the corresponding area of the wall of the die cavity. The chief difficulty, therefore, encountered in the reforming of rail joint bars is in the forming of the fishing surface of the flange of the rail with absolute accuracy. This is highly important in this art. A further important feature of my invention is that the accurate forming of the fishing surface of the flange also assures proper spacing of the head and flange fishing surfaces and, therefore, full height of the bar.

I have found that absolute accuracy in the fishing surface of the flange, as well as the head, of the bar can be obtained by subjecting the bar to applied pressure in one direction and then converting this applied pressure to pressure in another direction substantially oblique to the first direction and toward the flange of the bar, the direction in which the applied pressure is converted having components oblique to the direction of the first or applied pressure.

This accomplishes important results in that it subjects the flange of the bar to pressure in the direction of such flange, this pressure serving to force the flange tightly against the corresponding forming surface of the wall of the die cavity. The bar is thus spread slightly in the direction of the flange and the fishing surface of the flange is formed accurately by the corresponding surface of the forming die. I am also enabled, by this method, to apply sufficient pressure to the flange of a one way wear bar to assure proper reforming of the flange with a continuous and accurately formed fishing surface.

Figure 7:
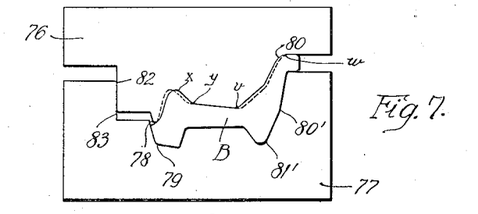
Figure 7 is an end view of a pair of dies illustrating one form of my invention.

While my invention is directed mainly toward the proper reforming of the flange fishing by lateral pressure, there are cases where it is desired to direct this lateral pressure toward the head portion of the bar. In such cases, the resistance caused by partial formation of the flange fishing, forces the dies into alignment against the lock collars as shown in Fig. 7.

Figure 5:
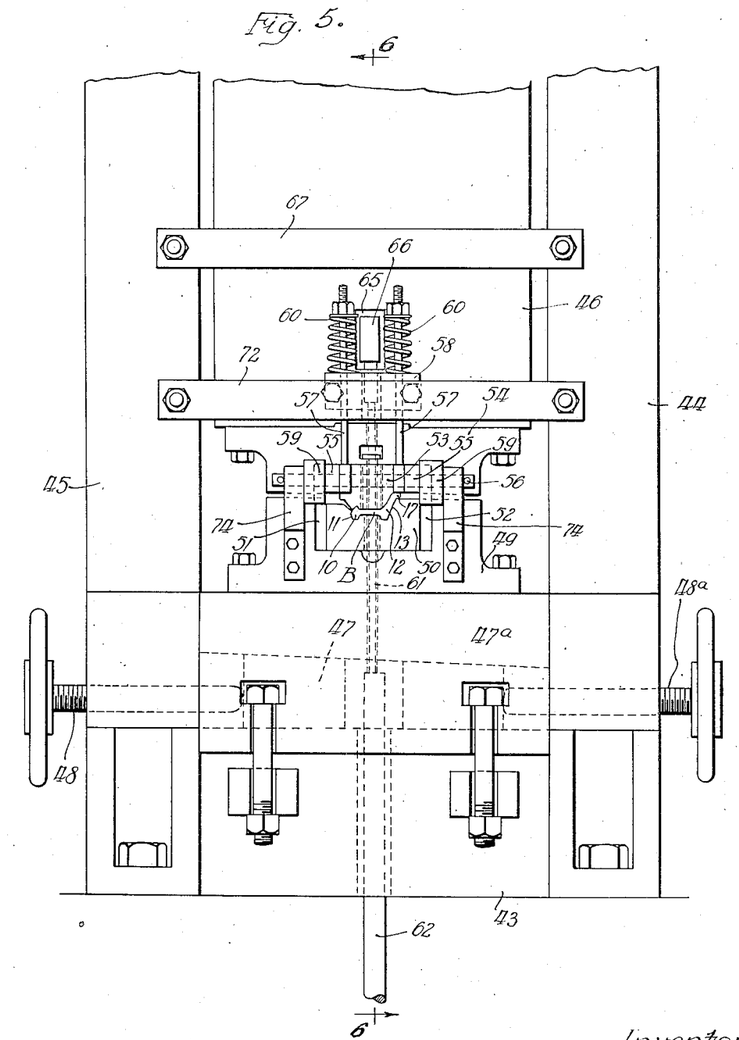
Figure 5 is a front elevation of a die press adapted for use in reforming the bars.
Figure 6:
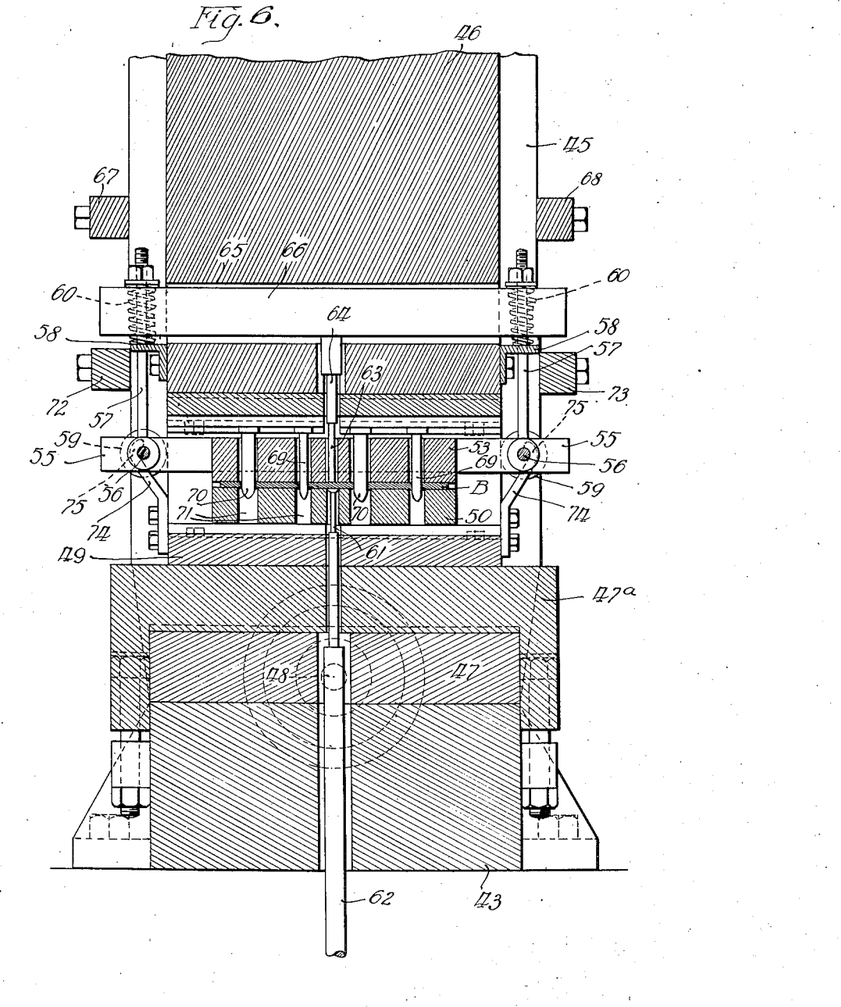
Figure 6 is a section taken substantially on line 6—6 of Figure 5.

In order that the applied pressure for reforming the bar may be converted into pressure in another direction, I provide dies which are mounted for relative lateral movement as well as relative movement toward and away from each other. It will be understood that the dies and press illustrated and described herein are shown merely by way of example and my method or process may be practiced in any other suitable manner. In Figures 5 and 6, I have illustrated a press and dies suitable for practicing my invention. The press and dies illustrated are similar to those disclosed in my copending application for Means for reforming worn angle bars, filed July 16th, 1926, Serial No. 122,864, which has matured into Patent Number 1,712,506, dated May 14, 1929, of which the present application is a division.

Referring more particularly to Figures 5 and 6, the dies are embodied in a machine or press comprising a base 43, two uprights 44 and 45, and a vertically movable cross head 46.

Upon the base, there is a horizontally slidable wedge 47 fixedly positioned between adjusting screws 48 and 48a. A wedge shaped bolster plate 47a is employed to engage the wedge 47 for vertical adjustment thereby. Upon the bolster plate, a die holder 49 is fixedly mounted. A lower die 50 is locked in the die holder between a plate or block 51 and a longitudinal wedge 52. A variation of this construction, used in the ordinary toggle-press, is a die holder bolted to the solid bed of the machine with the wedge adjustment above.

The die above described is considered as fixed and another die 53 is movable toward it, being carried by the cross-head 46. A die holder 54 is bolted to the cross head, but the upper die 53 is not fixedly mounted in said holder. The upper die 53 is narrower than the lower die 50 and is positioned between two stripping bars 55 rigidly secured to the die. The bars have ends extending beyond the uprights 44 and 45 of the machine as shown in Figure 6. The die 53 is held resiliently against the bottom of the die holder by a spring suspension of the stripping bars 55. A suitable means for so suspending the die comprises a cross rod 56 between adjacent ends of bars 55 forming a rectangular frame. Each rod 56 is suspended by a pair of hangers 57 vertically movable through a guide in the form of a shelf or bracket 58 carried by the cross head 46. Rollers 59 are mounted on the rods 56 to bear against the die holder. Between the shelf and the headed end of each hanger, there is a coiled spring 60 surrounding the shaft of the hanger.

The machine is also provided with knockout means to free the work piece from the dies. The lower die has a knockout pin 61 operated by a rod 62 passing downwardly through the die holder and the base. The upper die has a similar knockout pin 63 operated by a rod 64 passing upwardly into the crosshead to a transverse opening 65 therein. A bar 66, joined to the rod 64, extends through opening 65 and has its ends projecting from the cross-head to strike parallel cross-bars 67 and 68 secured to the uprights. As the dies 55 travel up, the bar 66 contacts the cross-bars 67 and 68, and the knockout pin becomes stationary and acts to strip the work from the die during the further upward movement of the cross-head.

A four hole bar B is shown in the press between dies 50 and 53. Round pins 69 and oval pins 70 are shown piercing the bar B. The pins are associated with the upper die and move downwardly with it entering holes 71 in the lower die. All the pins are round pointed to aid in forming the holes in the bar. The pins are mounted so as to be movable relative to the upper die, and in the present construction are carried directly by the cross-head. Any suitable or preferred means for attaching the pins to the cross-head may be employed, it being sufficient that the pins are suitably secured to the head.

Relative movement of the pins and the die 53 is produced by arresting the upward motion of the die while permitting the pins to be carried upwardly by the cross-head. This is readily obtained by providing a stop for the resiliently mounted die.

The stop comprises bars 72 and 73 secured on opposite sides of the uprights 44 and 45 and disposed in the path of the ends of stripping bars 55 carrying the die 53. When the stripping bars 55 strike the stop bars 72 and 73, upward movement of die 53 is arrested and, during the continued upward movement of the cross-head, the pins are withdrawn from the bar. If the bar adheres to the die after withdrawal of the pins, it will be stripped from the die by knockout pin 63 as the cross-head reaches the uppermost limit of its up stroke.

Spring latches 74, four in number, are arranged to hold the upper die down while the cross-head and die holder move upwardly. Each latch comprises a resilient projecting hook 75 of semi-circular shape to engage rod 56. These latches are mounted on the lower die holder 49. The release of the latch is effected by the springs 60 reaching their limit of compression so that a positive pull by the cross-head draws the rod 56 away from the latch. When the rods 56 are released from the latches, the die is projected upwardly by expansion of springs 60 at a greater speed than the upward movement of the cross-head thus causing the pins to strike the bar and strip it from the die. The various steps in the stripping operation need not be set forth in more detail herein, it being noted that the stripping of the work from the die is fully described in my copending application above referred to and is claimed therein.

An important feature of the die press above described, which is of primary importance in practicing my method of reforming bars, is the conversion of vertical die pressure to substantially lateral pressure. The bar B is so positioned between the dies that the wedge surfaces converge downwardly. The object of the die pressing is to reform the bar by spacing the wedge surfaces 11 and 13 further apart and at the proper angle. The dies, of course, determine the limit. This requires a lateral spreading, while the die holder 54 exerts only vertical pressure. The most important feature of my invention is, that this lateral spreading is in large part diverted in one direction, as compared with ordinary spreading in two opposing directions, this method of balancing lateral pressure to an unbalanced shape being directed to the proper reforming of the thin broad-surfaced and angularly positioned flange portion of the bar.

The above described mounting of the upper die holder permits lateral movement of the upper die 53 substantially parallel to the bars 67 and 68 and rods 56. This is highly desirable as contributing to the conversion of vertical pressure to substantially lateral pressure. Another contributory factor is the form of the bar, and another factor, which is of great importance, is the design of the registering surfaces of the upper and lower dies. To permit this desired lateral motion of the upper die, the pins 70 and 69 may be mounted for lateral shifting with the die, or the holes in the upper die through which the pins extend may be provided with a suitable clearance $c$. The holes 71 in the lower die 50 are also larger than the pins to permit relative movement between the dies.

In Figure 7, I have illustrated one form of my invention particularly suitable for reforming the head portion of the bar and also adapted for reforming the flange portion, as there are occasional cases in I-beam bars where it may be used, first reforming the flange fishing and then a projecting portion of the head. Two dies 76 and 77 are mounted for relative vertical movement, 76 being movable and 77 being fixed. The dies are assumed to be fully closed under full pressure. In this case, it is necessary to move the line $x-y$ to the left a predetermined amount, into the dotted line position indicated, in addition to properly reforming the flange fishing 80'—81'. This is done by draughting the flange at V—W *n amount so that its increasing resistance near closure will force die 76 to the left pushing $x-y$ to its dotted line location and no more, the lock 82—83 restricting movement to the left and there being no more movement to the right because the lock 82—83 is parallel to the vertical motion of the upper die. However, my invention is directed mainly to properly reforming the flange portion of the bar. Usually the head is a body of such mass that the problem of reforming it is simple compared to that of reforming the relatively long and thin flange of the bar. The flange not being far removed from the vertical is subjected to but indirect pressure. If this angle of the flange with the vertical were greater, the pressure exerted thereon would be less indirect, but such pressure is limited because of the head angle 78—79 of not over 14 degrees with the vertical, and there are other objections to placing the back of web 14 much removed from the horizontal. As the movable die 76 descends, the flange portion 80—81 thereof encounters the corresponding portion of the bar which exerts pressure on the die toward the left where a vertical wall 82—83 of the die 76 encounters a corresponding side or wall of the lower die 77. These walls constitute the die alinement or "lock" and, as illustrated, these walls are vertical, that is, are parallel to the direction of movement of the die 76.

Any considerable lateral pressure against this die lock will soon cause such wear as to render it ineffectual as a means for applying any appreciable pressure at 80'—81'. It is also particularly pointed out that any pressure which may be applied to the flange of the bar is downwardly, that is, vertical, and not in the direction of the flange. It is impossible to obtain accurate reforming of the bar flange in a die operating in this manner, unless there is lateral head resistance as described, this head resistance serving to relieve excessive pressure and wear on the collars 82—83. For ordinary flange reforming, the method is therefore ineffectual.

Figure 8:
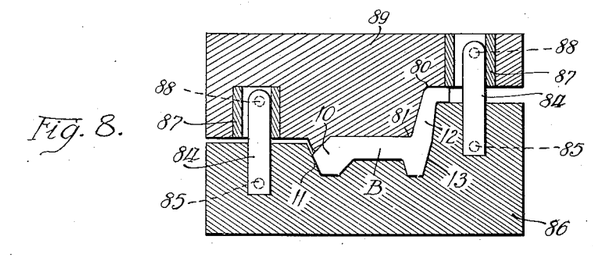
Figure 8 is a sectional view of a pair of dies illustrating another way of practicing my process or method in reforming of the bar.

In Figure 8 I have illustrated one form of die structure whereby my method of accurately reforming dies can be practiced. Dowel pins 84 are adjustably secured by set screws 85 in recesses in a lower fixed die 86. These pins project upwardly above the die for engagement into bushings 87 secured by set screws 88 in suitable recesses in an upper movable die 89. This upper die is mounted for lateral movement, as in Figures 5 and 6. The pins 84 are tapered and the parts of the die structure are so disposed and related that the upper die 89 in its descent first contacts flange 12 of bar B along surface 80—81 of the die 89 so as to shift it toward the left out of alinement with die 86. As downward movement of die 89 continues the dowel pins 84 enter the bushings 87 and coact therewith to shift die 89 toward the right into alinement with die 86. In this manner the vertically applied pressure of die 89 is converted to lateral pressure toward the right, that is, in the direction of the flange of the bar thus forcing the flange against the cooperating wall of the die cavity under forming pressure.

In this manner, I assure that the fishing surface of the flange is accurately formed, which is of primary importance. As previously noted, the head of the bar constitutes a body or mass of metal of sufficient extent to be readily spread into forming contact with the fishing forming surface of the die producing an accurate fishing surface on the head. It is not essential that the die 89 be offset to the left during the first part of its closing movement, in all cases, since very satisfactory results are accomplished by having the die 89 initially offset to the left relative to die 86 and alining die 89 with die 86 as it moves into full closed position. The operation in converting the vertical applied pressure to lateral pressure in the direction of the flange of the bar is the same in either case. This form of die structure is not, from a practical standpoint, the best and may be considered rather crude. However, it illustrates one means by which my method may be practiced. The pins 84 and the bushings 87 wear away rapidly due to the great amount of pressure to which the contact surfaces of these members are subjected. After the surfaces have worn to such an extent as to render the operation of the dies inaccurate, which occurs quite rapidly, the set screws 85 and 88 are loosened and the pins and the bushings are given a quarter turn to present new wearing surfaces. After the pins and the bushings have been adjusted four times and these wearing surfaces have been used to such an extent as to render the dies inaccurate, the pins and bushings are of no further use and must be replaced.

A less practical method, although following the teaching of my invention, is to use tapered ways for the cross-head of the press so that the cross-head will shift slightly sideways near the bottom of its stroke. A similar effect may be gained by using untapered cross-head ways placed laterally off of their natural positions so as to oppose lateral shifting of the dies as they meet the resistance of the bar flange. I find in practice, however, that the most satisfactory results are accomplished by confining means for insuring lateral forming pressure to the die holders or dies, preferably the latter, in that the side lock or lateral thrust means may be machined to take up wear at the same time as the dies, and because it is difficult to make and preserve accurate alignment when employing means in the press, die-holders, or anywhere not in the die themselves.

Figures 9, 10, 11:
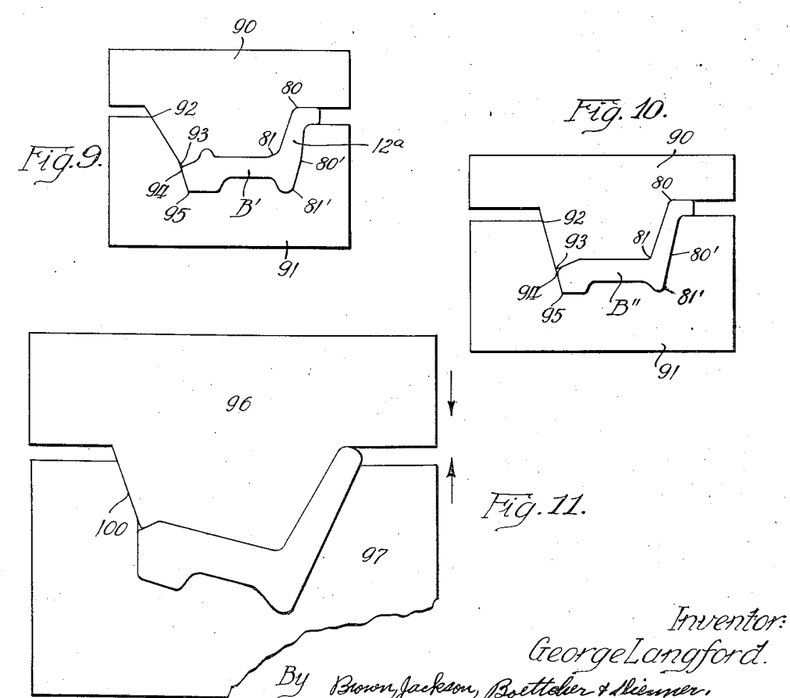
Figure 9 is an end view of a pair of dies illustrating a preferred way of practicing my method in the reforming of the bars.
Figure 10 is a view similar to Figure 9 illustrating still another way of practicing my method.
Figures 11 to 15 are semi-diagrammatic views illustrating different forms of dies and various ways of positioning the bar, used in reforming of the bar.

In Figures 9 and 10, I have illustrated dies which I find to be highly efficient in practicing my method of reforming bars. Referring more particularly to Figure 9, an upper die 90 is mounted in a press for movement vertically toward and away from a lower fixed die 91, the die 90 being also mounted for lateral movement in the same manner as the upper die illustrated in Figures 5 and 6. The two dies are provided with a diagonal thrust lock 92—93 fitted accurately throughout the length of both dies so that when the dies are closed and are tight together at 92—93, the draft or reduction of the flange area 80—81, 80'—81' is assured. The action is as follows—as the upper or moving die descends and nears the completion of its stroke, the die surface between the points 80—81 encounters the corresponding portion of the flange 12a of the bar B', striking a glancing blow which shifts the top die to the left until the lock surfaces engage at 92—93 which surfaces, being a diagonal, force the top die to the right and continue to do so until the completion of the stroke. This gives the desired effect upon the flange—a powerful and increasing lateral pressure at 80—81 to force the metal of the flange hard against the lower die at 80'—81' and secure the desired work upon the flange bearing portion of the bar. It is an effective means for securing powerful lateral pressure from vertical pressure as disclosed in my copending application above identified.

A further practical advantage of this die structure is that wear resulting from friction is quickly compensated for by dressing down the lock surfaces and bar recesses jointly, the wear of the lock surfaces 92—93 being restored when the wear on the die fishing surfaces 94—95 and 80'—81' require restoration, both being brought back accurately to proper fit and alinement in both dies by machining down or sinking the pass in each die vertically. The surfaces 92—93 and 80—81 in the top die and 94—95 and 80'—81' in the bottom die, being opposing diagonals, are restored to their proper horizontal alinement by slight vertical machining. This provision for readily correcting wear is of great importance, second only to the provision for transforming vertical into lateral pressure; and both solve the difficult problem of properly reforming the flange fishing which would otherwise be extremely difficult, if not impossible, since in the prior art most of the pressure is deflected away from the bar flange to the head and the web portion of the bar and accurate forming of the fishing surface of the flange is impossible.

In practice I use several variations of the diagonal thrust idea above set forth. In short thick flanged bars, such as illustrated in Figure 9, the diagonal thrust is at a greater angle to the vertical than in dies used for reforming long thin flanged bars, such as illustrated in Figure 10, the lesser angle resulting in less lateral thrust.

The method above described of securing proper flange forming pressure, which is essential for properly reforming the flange fishing surfaces, even in cases of bars which are not excessively worn, frequently calls for assistance in the case of one way track bars previously described, and of badly corroded or worn bars, for it is much more difficult to smooth out irregularities and uneveness than it is to reform a flange simply worn down from end to end. I, therefore, provide further assistance in these extreme cases by the use of means whereby the web portion of the bar is thinned laterally by increased draft at 80—81 in the central one-third of the bar making the flange thinner at its center vertically when in its upright position bolted to the rail. This is shown in Figure 9 and forms the subject matter of my copending application for renewing worn angle bars, filed March 10, 1928, Serial No. 260,695, which has matured into Patent Number 1,732,650, dated October 22, 1929. This concentration of pressure at the center, combined with the lateral thrust by the diagonal lock, gives the desired result so that irregularities such as one way track flanges, pitted and ground flanges and flange lips are pressed out. As regards the bar head, lumps from welding in metal, ground recesses for incipient cracks and deep pittings partially ground out, are smoothed out by the assistance, when needed, of laterally beveling the dies so as to thin the bar at the center as disclosed in my co-pending application, Serial No. 260,695, above identified.

In securing lateral pressure, I do not wish to be limited to the diagonal thrust collar, though I find it well suited for accomplishing the desired results. Other means or methods may be employed to secure this side thrust, however. Also, I do not wish to be limited to the degree or amount of angle of the thrust collar or lock since this may be varied within limits. A vertical lock parallel with the direction of pressure gives no lateral thrust toward the flange but gives lateral thrust toward the head by a predetermined amount. Any departure from the vertical gives side thrust toward the flange increasing with the angle, although more power is lost in friction at the lock as the angle increases. In Figure 10, the construction and operation of the dies is essentially the same as that of Figure 9 except as to the angle of the lock and the greater draft exerted on the bar. The side thrust in Figure 10 is less than the side thrust in Figure 9, the bar B'' of Figure 10 being of a different type than that of Figure 9, which latter bar requires greater pressure and side thrust in the direction of the flange to properly reform it. In its broader aspects, my invention consists in reforming the bar by subjecting the same to forming pressure in a forming die and converting the initially applied pressure to pressure in a direction having a component substantially at right angles to the direction of the applied pressure, that is, the direction of the converted pressure being substantially oblique to the direction of the applied pressure and toward the flange of the bar, although in certain instances illustrated by Fig. 7, lateral motion and pressure is desired not toward but away from the flange.

Figure 13:
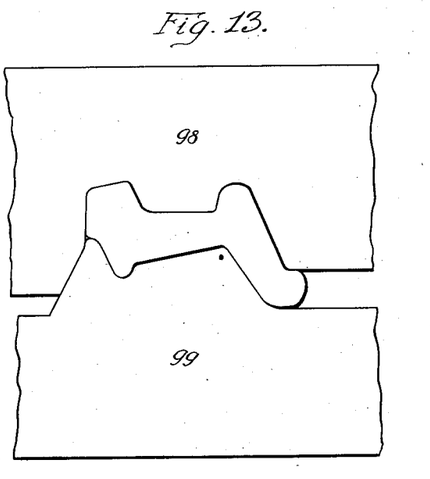

In practice I prefer to set the bar as in Figures 7 to 10, so that the back of the web is perpendicular to the direction of the initially applied pressure, this facilitating the use of pins in the upper die to preserve the size and spacing of the bolt holes. However, in cases where the pins are not used, the bar may be set at any angle, such as that of Figure 11, either die being movable in the direction indicated by the arrows. In this figure 96 designates the upper die and 97 the lower die. These dies may be placed in a vertical press, a side bulldozer, or other suitable machine for operating the dies. It will be noted that in Figure 11 the bar is tipped at an angle to the horizontal. In Figure 13, the bar is placed in the die reversely to Figure 11 and is also tipped from the horizontal. In this figure 98 designates the upper die and 97 the lower die. This tipping of the bar renders it possible to get more direct pressure on the flange of the bar than is possible when the die is not tipped, but the amount or extent to which the bar can be tipped is governed by the head fishing which must have slight clearance so that the bar will not be stuck fast in the die after it has been reformed.

Figure 12:
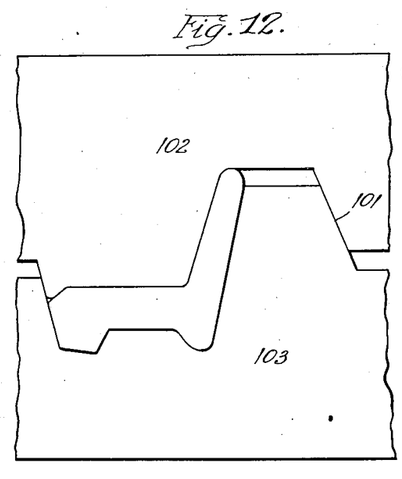

In Figure 11 the thrust lock is on the die and is designated 100. This lock is at the head of the bar. In Figure 12, the lock 101 is at the flange of the bar, the upper die being designated 102 and the lower die 103 in this figure.

Figure 14:
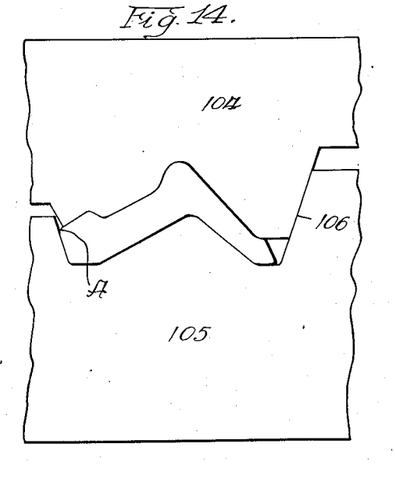
Figure 15:
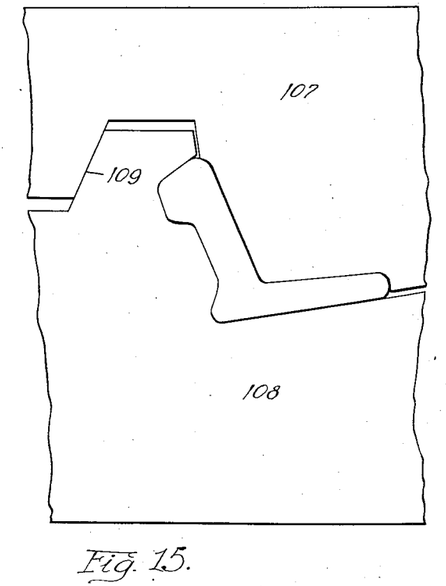

In Figure 14 the upper die is designated 104 and the lower die 105, the lock 106 being at the flange side of the bar. In this figure the bar is tilted and is disposed with the flange down, the arrangement of the bar illustrated being the best for securing a fair balance of pressure. This arrangement of the bar is, however, open to two serious objections; one being that the radius A would be over-filled necessitating machining to the proper curve, and the other being that the two fishings, head and flange, being in separate dies would result in fluctuation of fishing height. In Figure 15 the upper die is designated by 107 and the lower die by 108, the lock 109 being at the head side of the bar. The arrangement of the bar illustrated in this figure is objectionable in most cases although in some instances it may be found advantageous. Of the various positions which the bar may be set at, illustrated in Figures 11 to 15, inclusive, the positions of the bars illustrated in Figures 11 to 13 are the most practical in relation to pressure direction, in the order named, and in all cases the lack of pressure balance makes advisable some means for lateral thrust to properly reform the flange. Under ordinary conditions, however, I prefer to position the bar as illustrated in Figures 8 to 10 so that the pressure is applied to the bar from one side thereof and this initially applied pressure is converted to pressure applied to the flange of the bar in the direction thereof for accurately forming the fishing surface of the flange as above described.

What I claim is:

The method of reforming the flange fishing surface of an angle-type rail joint bar consisting in first applying pressure to the bar in one direction and then applying a supplementary pressure in another direction during the continuance of said initial pressure to the upper outer surface of the flange of the bar thereby to exert a lateral thrust thereon for reforming the flange fishing surface.

In witness whereof, I hereunto subscribe my name this 16th day of March, 1929.

GEORGE LANGFORD.